(12) United States Patent
Joshi et al.

(10) Patent No.: US 10,528,528 B2
(45) Date of Patent: *Jan. 7, 2020

(54) SUPPORTING MULTI-TENANT APPLICATIONS ON A SHARED DATABASE USING PRE-DEFINED ATTRIBUTES

(71) Applicant: International Business Machines Corporation, Armonk, NY (US)

(72) Inventors: Vinayak Joshi, Bangalore (IN); Pallavi Priyadarshini, Bangalore (IN); Parameswara R. Tatini, Bangalore (IN); Maryela E. Weihrauch, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 38 days.

This patent is subject to a terminal disclaimer.

(21) Appl. No.: 15/063,554

(22) Filed: Mar. 8, 2016

(65) Prior Publication Data
US 2016/0292236 A1 Oct. 6, 2016

Related U.S. Application Data

(63) Continuation of application No. 14/675,960, filed on Apr. 1, 2015.

(51) Int. Cl.
*G06F 16/00* (2019.01)
*G06F 16/18* (2019.01)
(Continued)

(52) U.S. Cl.
CPC ........ *G06F 16/1805* (2019.01); *G06F 16/248* (2019.01); *G06F 16/2455* (2019.01); *G06F 16/2471* (2019.01)

(58) Field of Classification Search
CPC ......... G06F 17/30598; G06F 17/30286; G06F 17/30554; G06F 17/30424; G06F 17/30477; G06F 16/2455; G06F 16/248; G06F 16/2471; G06F 16/24534; G06F 16/2453; G06F 16/245; G06F 16/24575; G06F 16/9535
(Continued)

(56) References Cited

U.S. PATENT DOCUMENTS 8,326,876 B1 12/2012 Venkataraman et al.
8,732,157 B2  5/2014 Weissman et al.
(Continued)

OTHER PUBLICATIONS

Appendix P "List of IBM Patents or Patent Applications Treated as Related"; dated Mar. 9, 2015; pp. 2.
(Continued)

*Primary Examiner* — Michelle N Owyang
(74) *Attorney, Agent, or Firm* — Edward J. Wixted, III (57) ABSTRACT

Exposing existing database server attributes that are used for load balancing, accounting, log filtering, problem determination, and end user identification as tenant identifiers. An example of such attribute is the values in existing client information fields that are available to applications for passing additional information to the database server via connections. These values are then used by the database server for enhanced operational functions of load balancing, accounting, log filtering, problem determination, and end user identification.

4 Claims, 7 Drawing Sheets

(51) Int. Cl.
*G06F 16/248* (2019.01)
*G06F 16/2455* (2019.01)
*G06F 16/2458* (2019.01)

(58) Field of Classification Search
USPC .................................................. 707/705–780
See application file for complete search history.

(56) References Cited

U.S. PATENT DOCUMENTS

| | | | | |
|---|---|---|---|---|
| 2011/0295728 | A1* | 12/2011 | Bulumulla | G06F 11/3476 705/34 |
| 2012/0151063 | A1* | 6/2012 | Yang | G06F 9/5011 709/226 |
| 2012/0233147 | A1* | 9/2012 | Solheim | G06F 17/30336 707/709 |
| 2012/0330926 | A1* | 12/2012 | Rajan | G06F 16/24542 707/718 |
| 2013/0173669 | A1 | 7/2013 | Tang et al. | |
| 2013/0297768 | A1 | 11/2013 | Singh | |
| 2014/0280065 | A1* | 9/2014 | Cronin | G06Q 30/0201 707/722 |

OTHER PUBLICATIONS

"A novel datasource and connection pool framework for multi-tenant database cloud", An IP.com Prior Art Database Technical Disclosure, Authors et. al.: Disclosed Anonymously, IP.com No. IPCOM000200460D, IP.com Electronic Publication: Oct. 14, 2010, pp. 1-3.

"Introduction to Workload Management", Database Oracle Clusterware and Oracle Real Application Clusters Administration and Deployment Guide, Copyright © 2014, Oracle and/or its affiliates, <http://docs.oracle.com/cd/B19306_01/rac.102/b14197/hafeats.htm>.

"System and method for virtualizing logging and tracing in a multi-tenant cloud environment including a logging query api", An IP.com Prior Art Database Technical Disclosure, Authors et. al.: Disclosed Anonymously, IP.com No. IPCOM000201734D, IP.com Electronic Publication: Nov. 19, 2010, pp. 1-2.

"The Force.com Multitenant Architecture", © Copyright 2000-2014 salesforce.com, Inc., <https://developer.salesforce.com/page/Multi_Tenant_Architecture>.

U.S. Appl. No. 14/675,960 entitled "Supporting Multi-Tenant Applications on a Shared Database Using Pre-Defined Attributes" filed Apr. 1, 2015.

* cited by examiner

SUPPORTING MULTI-TENANT APPLICATIONS ON A SHARED DATABASE USING PRE-DEFINED ATTRIBUTES

BACKGROUND

The present invention relates generally to the field of shared databases, and more particularly to multi-tenant applications on a shared database in a cloud environment.

Provisioning common resources in the database layer to support multiple tenants is a common problem which software-as-a-service (SaaS) vendors face with the proliferation of cloud environments. One model that has emerged to address this problem is sharing the same database instance for multiple tenants. In that way, costs are lowered. There are two state of the art variations that follow this model. They are: (i) multiple tenants share the same tables with a mechanism to identify the rows belonging to each tenant (for example, a tenant identifier (ID) is used as a column in the database table and each SQL (structured query language) query includes a tenant ID to filter out the rows corresponding to a particular tenant); and (ii) each tenant has its own dedicated database table with a mechanism to identify the tables belonging to each tenant (for example, a different schema is used for each tenant so that each tenant has a different database table and each tenant uses their schema in SQL queries to redirect the queries to their tables).

SUMMARY

According to an aspect of the present invention, there is a method, computer program product and/or system for establishing a multi-tenant database that performs the following steps (not necessarily in the following order): (i) determining a database server attribute as a tenant identifier (ID) for a first tenant, (ii) receiving a database query originating from the first tenant, (iii) modifying the database query to create a modified query by injecting the tenant ID into the database query, and (iv) querying a database server with the modified query.

DETAILED DESCRIPTION

Exposing existing database server attributes that are used for load balancing, accounting, log filtering, problem determination, and end user identification as tenant identifiers. An example of such attributes is the values in existing client information fields that are available to applications for passing additional information to the database server via connections. The data, or values, in these fields are then used by the database server for enhanced operational functions of load balancing, accounting, log filtering, problem determination, and end user identification. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 1:
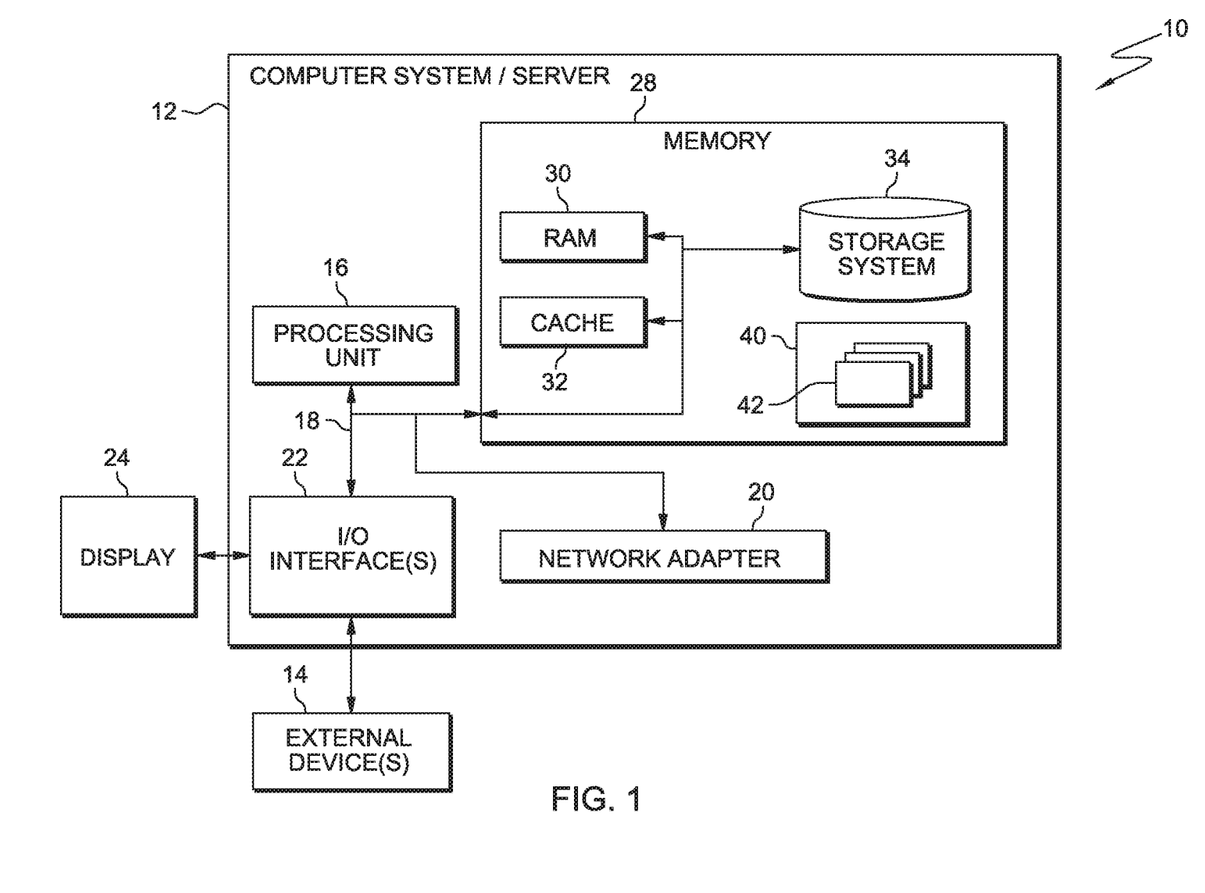
FIG. 1 depicts a cloud computing node used in a first embodiment of a system, according to the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
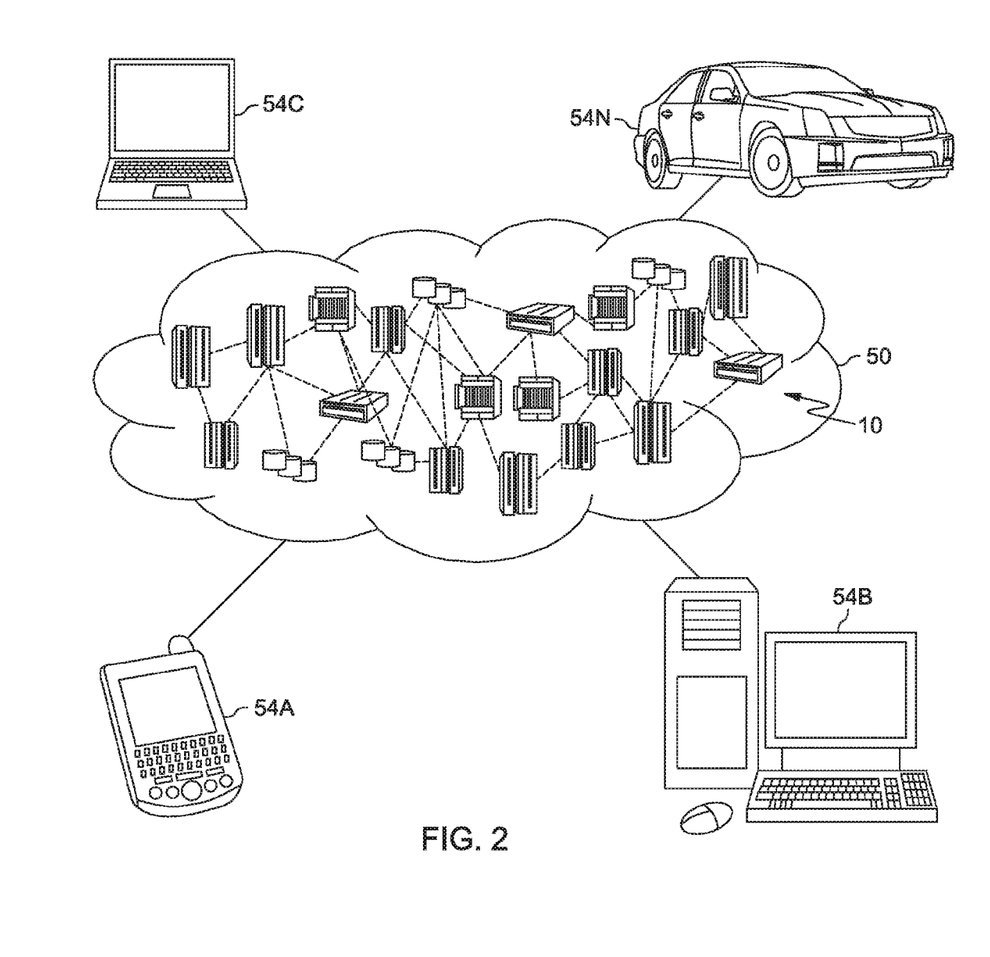
FIG. 2 depicts an embodiment of a cloud computing environment (also called the "first embodiment system"), according to the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
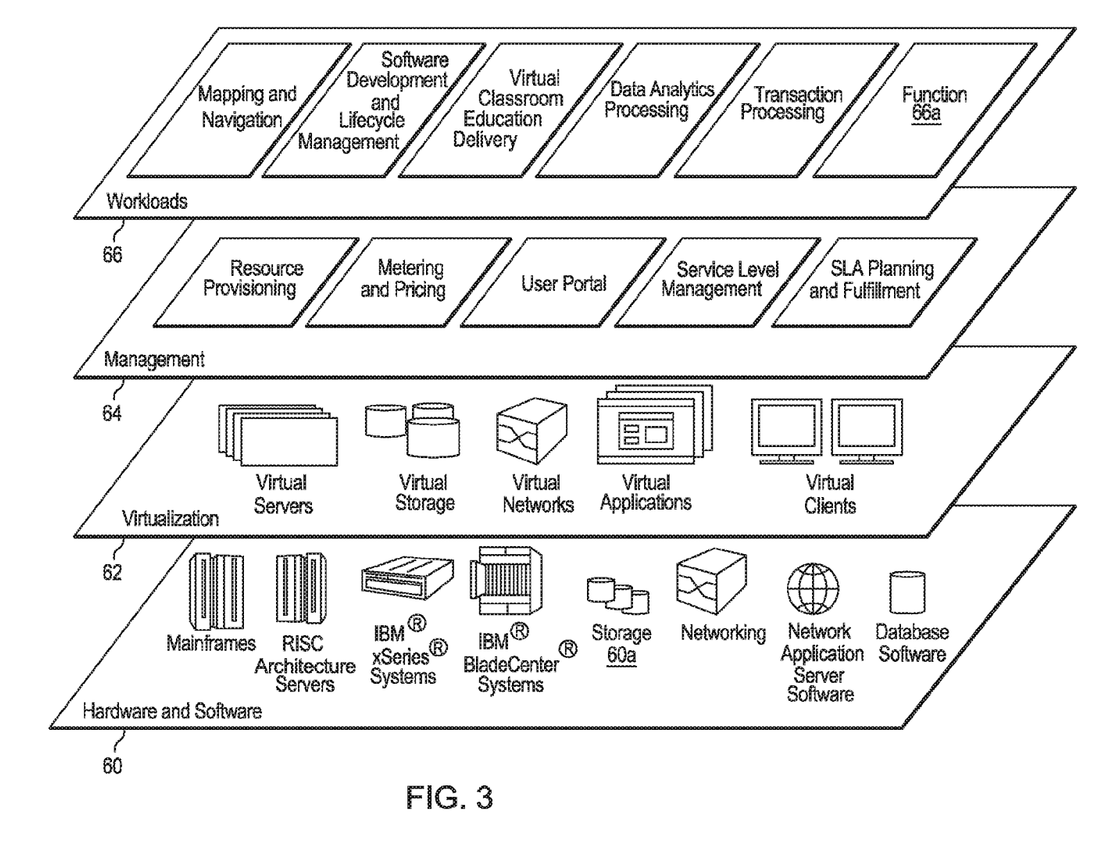
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and functionality according to the present invention (see function block 66a) as will be discussed in detail, below, in the following sub-sections of this Detailed description section.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. Example Embodiment

Figure 4:
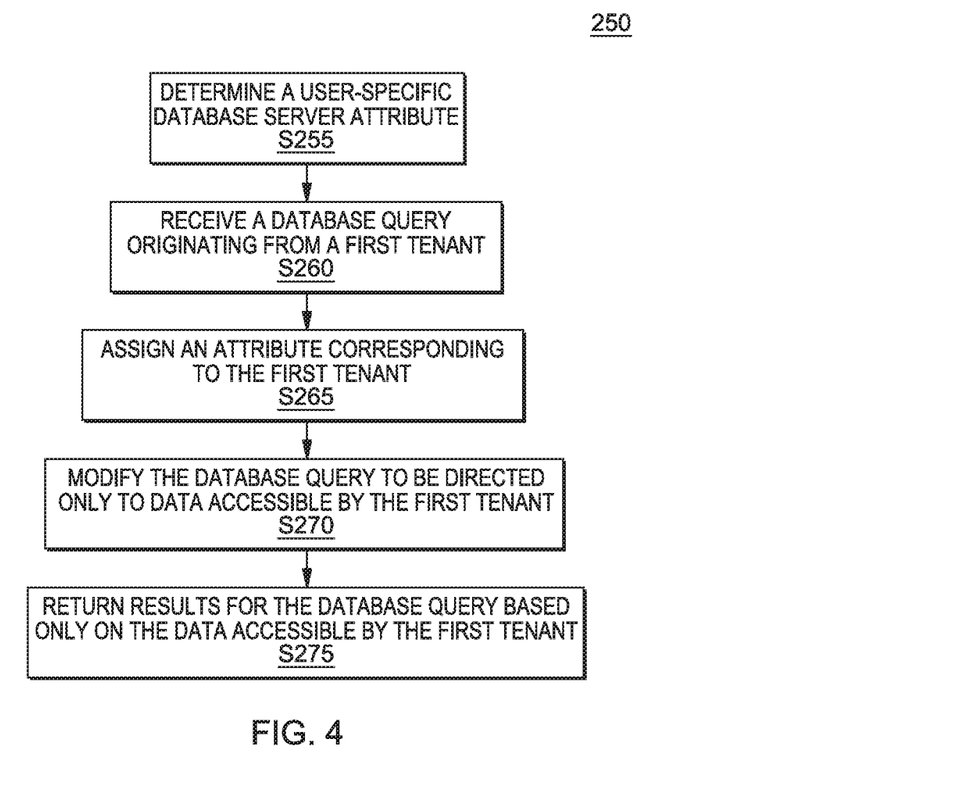
FIG. 4 is a flowchart showing a first embodiment method performed, at least in part, by the first embodiment system.
Figure 5:
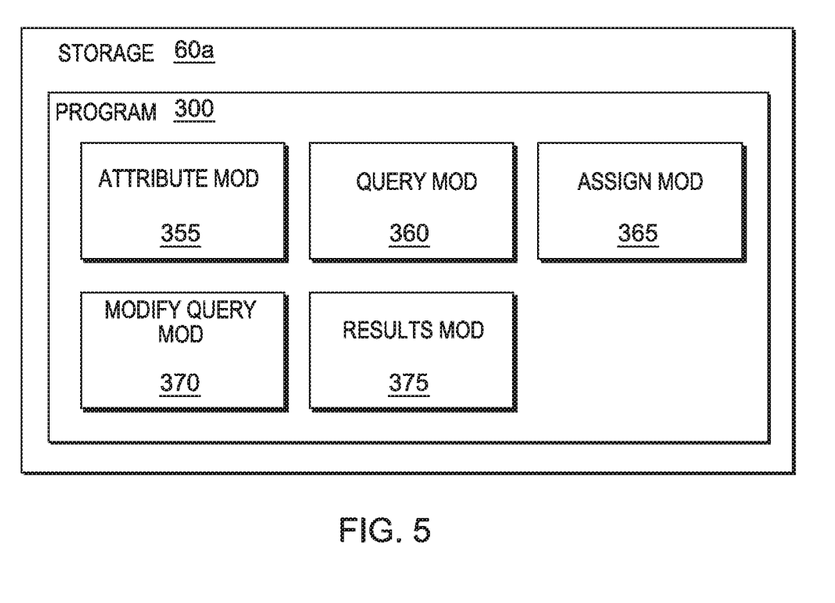
FIG. 5 is a block diagram view of a machine logic (for example, software) portion of the first embodiment system.

FIG. 4 shows flowchart 250 depicting a method according to the present invention. FIG. 5 shows program 300 for performing at least some of the method steps of flowchart 250. This method and associated software will now be discussed, over the course of the following paragraphs, with extensive reference to FIG. 4 (for the method step blocks) and FIG. 5 (for the software blocks). As shown in FIG. 5, one physical location where program 300 may be stored is in storage block 60a (see FIG. 3).

Processing begins at step S255, where attribute module ("mod") 355 determines a user-specific database server attribute. In the examples discussed at length below, the attribute is "client userid" provided in the client information field of the database. Each user, or data owner, is identifiable by a unique client identifier corresponding to the "client userid" attribute.

Processing proceeds to step S260, where query mod 360 receives a database query originating from a first tenant. In this example, Able, a tenant who shares a database table with Baker on the same database server, submits a query. Able and Baker share data on the same database table but do not want to share the data itself. A database query from Able should only return data owned by, or otherwise accessible to, Able. In this multi-tenant database table, the process that follows returns only data corresponding to Able. Alternatively, Able and Baker share a database server but not the same table. Similarly, a query from Able should only return data found in table(s) corresponding to Able, and not Baker.

Processing proceeds to step S265, where assign mod 365 assigns a user-specific attribute corresponding to the first tenant. In this example, the user-specific attribute assigned to Able is the pre-determined client user ID "MyData." This user ID is associated with Able's user account when it is initially set up. Conventional use of this user ID is for load balancing, accounting, log filtering, problem determination, and/or end user identification. In this example, the pre-determined user ID is used to identify Able as a tenant in a multi-tenant shared database.

Processing proceeds to step S270, where modify query mod 370 modifies the database query to be directed only to data accessible by the first tenant. In this example, the database query submitted by Able is modified to include the tenant ID "MyData." For example, in SQL, a query originally written as "select SALES from Table" is re-written to the query "select SALES from Table, where Tenant ID="MyData." It should be noted that other query languages may apply the tenant ID differently with the same outcome. That is, the query is modified such that only data to which Able should have access is returned from Able's query. Other examples of this query modification are provided in Section III of this Detailed Description. These examples also use SQL as the example query language.

Processing ends at step S275, where results module 375 returns results for the database query based only on the data accessible by the first tenant. In this example, Able receives only data within the database table that belongs to Able, keeping Baker's data out of the query result by use of the unique Tenant ID that is assigned to Able and modified for processing Able's query. The use of a database driver, discussed in more detail below, is how some embodiments of the present invention process queries and return results according to the unique Tenant ID.

III. Further Comments and/or Embodiments

Some embodiments of the present invention recognize the following facts, potential problems, and/or potential areas for improvement with respect to the current state of the art. While conventional approaches to sharing databases for multiple tenants may work, activities that are critical in the database layer such as accounting, monitoring, problem determination, log filtering, and workload prioritization need to be tailored to fit the multi-tenant paradigm to achieve higher investment in and adoption of multi-tenant databases.

Some embodiments of the present invention expose existing database server attributes that are used for workload balancing, accounting, log filtering, and problem determination as tenant ids. An example of a database server attribute is the data in a client info field that is used by a database server for the functions noted above. Injection of these tenant-specific attributes can be done in any layer between the application layer and the database layer, such as a database driver, so that the application does not need any code change to be tenant aware. If a database has shared data, or a shared table, between different tenants, selected existing attributes, such as those found in the client info field, are used for returning qualified data to the requesting tenant. The assignment of existing attributes as tenant IDs also supports determining a priority of connections coming in from different tenants, writing accounting statistics based on tenant usage, and identifying tenants in the problem determination data, such as traces and logs.

One example of the server attribute, client info field, being used to determine priority follows. In conventional database servers, the definition of service classes for workload management is allowed. The service classes can be assigned priorities such as high, medium, and low. Workloads and/or connections with certain values of client info fields can be assigned to these service classes. In that way, incoming workloads get serviced in the order of priority as defined by the associated service classes. So, if the client info fields are exposed as tenant ids, rules can be defined to assign priorities to the various requests from tenants.

In another example, a database server may include accounting reports, which contain collective information about accounting statistics, such as elapsed time and CPU, or processor, time. These statistics are often used to assign appropriate charges to clients for services. Identifiers such as those found in client info fields can be used to segregate the data and determine chargeback to different tenants.

Similarly, for problem determination, a database server may include traces which contain collective information about all threads and/or applications running on the server. For problems arising with a particular tenant workload, it becomes easy for database server admin to segregate the traces for that tenant, based on the data in the client info fields.

Some embodiments of the present invention use standard client information fields to support multiple tenants sharing the same database. Database drivers are used to add some level of intelligence (discussed in more detail below) to enhance SQL queries with these client info fields before sending to the database. With some configurations at the driver/middleware layer, multi-tenancy to a degree suitable for many types of applications is achieved.

Client info fields, such as "client userid" are used to implement both conventional models discussed in the background section, above. Other client info fields that can carry information to uniquely identify a tenant, or map the incoming request to a tenant ID, include: (i) client application name, "client_applname;" (ii) client accounting string "client_acctng;" and (iii) client workstation name "client_wrkstnname." Alternatively, other connection attributes used for workload definition that may be exposed as tenant ids to achieve easy multi tenancy include: (i) IP address of client; (ii) system authentication ID; (iii) session authentication ID; and/or (iv) role. This new behavior can be controlled as a new driver property, for example, in "MultiTenancyMode." In some embodiments of the present invention, the multiple tenancy driver property value is set to "Yes" to permit use of the database as a multi-tenant database. This takes on two values of SharedTable or SharedDatabase and dictates whether multiple tenants can share the same table (discussed below with respect to FIG. 6), or share the database via separate tables (discussed below with respect to FIG. 7).

Figure 6:
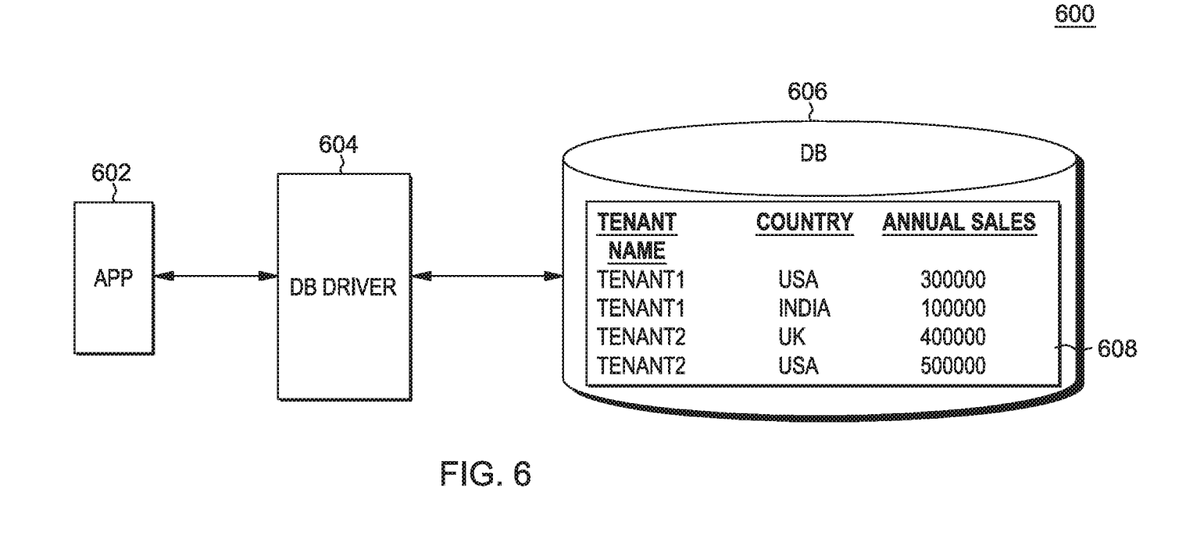
FIG. 6 is a block diagram view of a second embodiment of a system, according to the present invention.

FIG. 6 is a system diagram illustrating the example where multiple tenants share the same tables. In this example, database system 600 includes: application 602; MultiTenancyMode database driver 604; shared database 606, and shared table 608. The MultiTenancyMode driver property value is, in this example, SharedTable, which provides for multiple tenants to share the shared table. Connections from each tenant have a particular value for the client userid.

The example process that follows is provided for further understanding of the operation of some embodiments of the present invention. Application 602 requests that MultiTenancyMode database driver 604 set the current user as "Tenant1." Upon receipt of the client info field value "Tenant1," the driver converts the client userid into the corresponding tenant ID and rewrites the query to include the tenant ID in the query itself. For example, when the client userid is set to "Tenant1," and the SQL query coming from a connection is "select COUNTRY from TBL," only those rows from the shared table that belong to Tenant1 are selected. The driver intercepts and rewrites the query to "select COUNTRY from TBL, where Tenant ID="Tenant1." The results of the intercepted and modified query are "USA, India," which are retrieved from shared database 608 with respect to only Tenant1.

Figure 7:
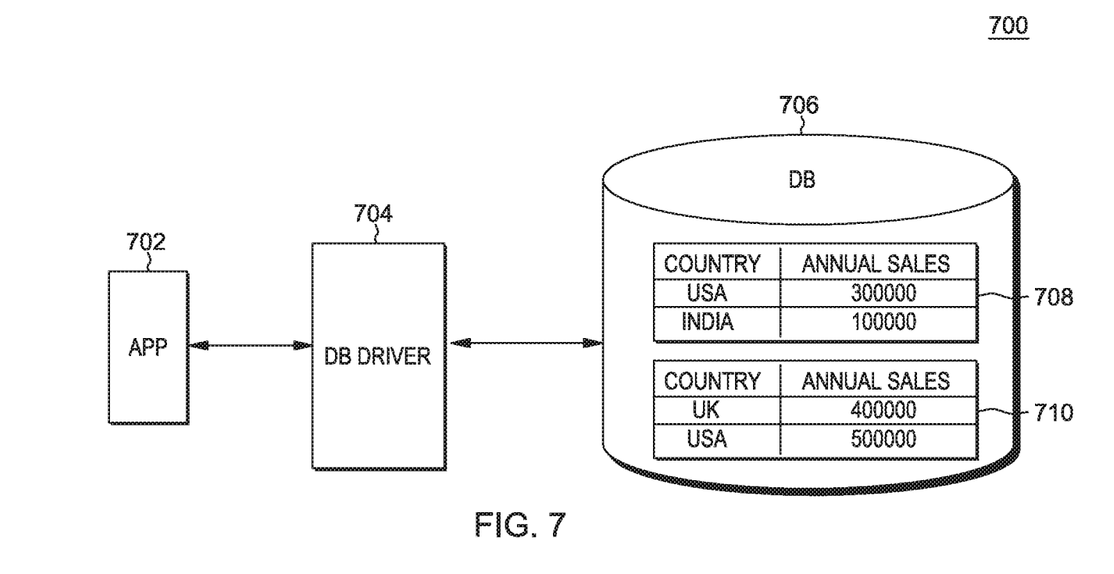
FIG. 7 is a block diagram view of a third embodiment of a system, according to the present invention.

FIG. 7 is a system diagram illustrating the example where each tenant has its own dedicated database table. In this example, database system 700 includes: application 702; MultiTenancyMode database driver 704; shared database 706; tenant1 table 708; and tenant2 table 710. The Multi-TenancyMode driver property value is, in this example, SharedDatabase, which provides for multiple tenants to maintain a private table, such as tenant2 table 710, in the shared database. Connections from each tenant have a particular value for the client userid.

The example process that follows is provided for further understanding of the operation of some embodiments of the present invention. Application 702 requests that Multi-TenancyMode database driver 704 set the current user to "Tenant2." Upon receipt of the client info field value "Tenant2," the driver converts the client userid into a schema. For example, when the client userid is set to "Tenant2" and the SQL query coming in from a connection is "select COUNTRY from Table," the query is routed to Tenant2 table 710 by the driver rewriting the query to "select COUNTRY from Tenant2.Table. The results of the intercepted and modified query are "UK, USA," which are retrieved only from tenant2 table 710.

It should be noted that, in some embodiments of the present invention, existing security mechanisms are used to ensure that pre-determined levels of security are maintained among multiple tenants for the driver property values of SharedTable and SharedDatabase, discussed above. These security mechanism include, but are not limited to: (i) trusted context; (ii) encryption; and (iii) views.

Some embodiments of the present invention may include one, or more, of the following features, characteristics and/or advantages: (i) reuses the end-to-end infrastructure of applications, middleware, and/or databases and the corresponding mechanisms already used for accounting, monitoring, problem determination, log filtering, and workload prioritization to support multiple tenants; (ii) existing single-tenant applications are converted into multi-tenant applications with no code changes required; (iii) addresses an efficient way of transmitting tenant information that can be utilized for purposes more than just data access that are also needed in a multi-tenant database applications, such as WLM configuration, monitoring, and log filtering; (iv) no need to build a system from the ground up for multi-tenancy where significant work is required in the creation of a new kind of RDBMS system and a runtime engine to support multi-tenant applications; and/or (vi) uses existing DB2 RDBMS (relational database management system) as-is, or with only a few changes, using an existing infrastructure and building on it to support a method a multi-tenancy that should suit a reasonable proportion of applications (Note: the term(s) "DB2" may be subject to trademark rights in various jurisdictions throughout the world and are used here only in reference to the products or services properly denominated by the marks to the extent that such trademark rights may exist).

Some embodiments of the present invention may include one, or more, of the following features, characteristics and/or advantages: (i) addresses how a tenant is identified to the database server; (ii) new infrastructure need not be built on the database server/middleware to the share database among multi-tenant applications; (iii) new infrastructure need not be built on the database server/middleware to be able to do enhanced operational functions; (iv) existing applications can easily be converted into multi-tenant applications without a code change by injecting client information fields in middleware layer; (v) uses existing database attributes as tenant IDs instead of a network-based approach to generate tenant IDs; (vi) reuses existing database infrastructure and tooling for tenant analysis with the use of client information fields as tenant IDs; (vii) allows use of database fields as tenant IDs that are not tied to a network address, giving more flexibility in the application layer; (viii) uses existing database attributes to store multiple tenant data in the same database, and does not relate to optimization of queries; and/or (ix) applications need not change in order to exist in a shared database model because more infrastructure is not needed at database/middleware layer to enable sharing of same database by multiple tenants as well as do value added database functions on top of shared data.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Electrically Connected: means either directly electrically connected, or indirectly electrically connected, such that intervening elements are present; in an indirect electrical connection, the intervening elements may include inductors and/or transformers.

Mechanically connected: Includes both direct mechanical connections, and indirect mechanical connections made through intermediate components; includes rigid mechanical connections as well as mechanical connection that allows for relative motion between the mechanically connected components; includes, but is not limited, to welded connections, solder connections, connections by fasteners (for example, nails, bolts, screws, nuts, hook-and-loop fasteners, knots, rivets, quick-release connections, latches and/or magnetic connections), force fit connections, friction fit connections, connections secured by engagement caused by gravitational forces, pivoting or rotatable connections, and/or slidable mechanical connections.

Data communication: any sort of data communication scheme now known or to be developed in the future, including wireless communication, wired communication and communication routes that have wireless and wired portions; data communication is not necessarily limited to:

(i) direct data communication; (ii) indirect data communication; and/or (iii) data communication where the format, packetization status, medium, encryption status and/or protocol remains constant over the entire course of the data communication.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method for managing a multi-tenant database, the method comprising:
   implementing a database server comprising attributes of each tenant among a plurality tenants in a multi-tenant database system, the attributes being selected from a group consisting of: (i) an application name; (ii) an accounting string; (iii) a workstation name; (iv) an internet protocol (IP) address; (v) a system authentication identifier; (vi) a session authentication identifier; (vii) a service class;
   receiving, from a first tenant of the plurality of tenants, a structured query language (SQL) database query directed to a multi-tenant database, where the SQL database query comprises a client information field of the attributes of the first tenant, the client information field having been set up in conjunction with creation of a user account of the first tenant, and the client information field comprising the IP address of the first tenant;
   determining a tenant identifier (tenant ID), of the first tenant, by reference to the client information field from the IP address using the attributes of the first tenant in the database server;
   injecting, the tenant ID into the SQL database query to produce an injected database query;
   determining a priority level of a connection of the injected database query by the first tenant to the multi-tenant database from a set of priority levels based on service class of the first tenant;
   establishing a workload balance action responsive to the connection of the injected database query according to the priority level and workload of the multi-tenant database system;
   sending the injected database query to the database management system according to the workload balance action and the session authentication identifier of the first tenant;
   receiving a query result from the database management system based on the system authentication identifier of the first tenant;
   sending the query result to the first tenant; and
   responsive to receiving the database query, writing the first tenant ID in: a trace, a log, and accounting statistics;
   wherein at least the injecting step is performed by computer software running on computer hardware.

2. The method of claim 1, wherein the multi-tenant database includes a shared database table including first tenant data owned by the first tenant and second tenant data owned by a second tenant.

3. The method of claim 1, wherein the multi-tenant database includes a first tenant table owned by the first tenant and a second tenant table owned by a second tenant.

4. The method of claim 1, further comprising: writing a set of accounting statistics based on a tenant usage.

* * * * *